US008298120B2

(12) United States Patent
Sato et al.

(10) Patent No.: US 8,298,120 B2
(45) Date of Patent: Oct. 30, 2012

(54) ACCELERATION SHOCK REDUCTION CONTROL SYSTEM FOR VEHICLE

(75) Inventors: Katsumi Sato, Saitama (JP); Naohisa Okawada, Saitama (JP); Ryuta Niimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1312 days.

(21) Appl. No.: 12/021,152

(22) Filed: Jan. 28, 2008

(65) Prior Publication Data

US 2008/0182716 A1 Jul. 31, 2008

(30) Foreign Application Priority Data

Jan. 31, 2007 (JP) ................................ 2007-022335

(51) Int. Cl.

| | |
|---|---|
| ***F16H 59/74*** | (2006.01) |
| ***B60W 10/04*** | (2006.01) |
| ***B60W 10/10*** | (2012.01) |
| ***F02P 5/00*** | (2006.01) |

(52) U.S. Cl. .................... 477/102; 477/110; 123/406.25

(58) Field of Classification Search .................. 477/110, 477/111, 115, 116, 117, 120, 132–141, 34, 477/101–107; 701/51, 53, 69, 70, 85, 90, 701/103, 105, 99, 110; 123/406.25, 406.36, 123/406.46, 406.5–406.6

See application file for complete search history.

(56) References Cited

U.S. PATENT DOCUMENTS

| | | | | |
|---|---|---|---|---|
| 4,909,224 | A * | 3/1990 | Nishiyama et al. | 123/406.51 |
| 5,282,400 | A * | 2/1994 | Kobayashi et al. | 477/37 |
| 5,403,247 | A * | 4/1995 | Yagi | 477/107 |
| 5,722,363 | A * | 3/1998 | Iida et al. | 123/305 |
| 5,827,150 | A * | 10/1998 | Mukumoto | 477/101 |
| 6,832,147 | B2 * | 12/2004 | Vornehm et al. | 701/54 |
| 2001/0003720 | A1 * | 6/2001 | Lee | 477/54 |
| 2003/0106515 | A1 * | 6/2003 | Kondo | 123/179.4 |
| 2004/0097328 | A1 * | 5/2004 | Makiyama et al. | 477/43 |
| 2004/0187845 | A1 * | 9/2004 | Clemence et al. | 123/396 |
| 2004/0237935 | A1 * | 12/2004 | Fukusako et al. | 123/406.47 |
| 2005/0234624 | A1 * | 10/2005 | Matsushima et al. | 701/51 |
| 2005/0261111 | A1 * | 11/2005 | Kurogo et al. | 477/169 |
| 2006/0157014 | A1 * | 7/2006 | Kondo | 123/179.4 |
| 2006/0178796 | A1 * | 8/2006 | Kuwahara et al. | 701/51 |
| 2007/0017480 | A1 * | 1/2007 | Kondo | 123/198 F |
| 2007/0021268 | A1 * | 1/2007 | Sakamoto | 477/115 |
| 2007/0028690 | A1 * | 2/2007 | Hirowatari et al. | 73/514.34 |
| 2007/0062489 | A1 * | 3/2007 | Miyata et al. | 123/406.47 |
| 2008/0183369 | A1 * | 7/2008 | Kitagawa | 701/103 |

FOREIGN PATENT DOCUMENTS

JP 2004-60528 A 2/2004

* cited by examiner

*Primary Examiner* — Khoi Tran
*Assistant Examiner* — Abby Lin
(74) *Attorney, Agent, or Firm* — Birch, Stewart, Kolasch & Birch, LLP

(57) ABSTRACT

An acceleration shock reduction control system for a vehicle which can reduce a shock at a transition to an accelerating state without deteriorating an acceleration response. An acceleration shock reduction control system for vehicle includes a control unit which determines a transition from a decelerating state to an accelerating state, and which thus controls the ignition of an internal combustion engine to adjust the output of the engine. In the acceleration shock reduction control system, upon detecting the transition from the decelerating state to the accelerating state, the control unit gives an instruction for an ignition cut which is executed over a predetermined time period Tr after a predetermined waiting time period Tw elapses.

12 Claims, 12 Drawing Sheets

ACCELERATION SHOCK REDUCTION CONTROL SYSTEM FOR VEHICLE

CROSS-REFERENCE TO RELATED APPLICATIONS

The present application claims priority under 35 USC 119 to Japanese Patent Application No. 2007-022335 filed on Jan. 31, 2007 the entire contents of which are hereby incorporated by reference.

BACKGROUND OF THE INVENTION

1. Field of the Invention

The present invention relates to an acceleration shock reduction control system for vehicle such as a motorcycle.

2. Description of Background Art

In general, in vehicles such as motorcycles, an acceleration shock often acts on the vehicle at the transition from a decelerating state to an accelerating state. This acceleration shock is caused by an event in which play existing in the drive system of the vehicle, that is, backlash is taken up. For the purpose of avoiding this acceleration shock, the following configuration has been conventionally proposed. More specifically, in this conventional configuration, shock due to backlash and the like at the transition from a decelerating state to an accelerating state is controlled by retarding the ignition timing of the engine, as well as by adjusting the operating time of a fuel-stage returning control. See, for example, Japanese Patent Application Laid-open Publication No. 2004-60528.

However, in the conventional configuration, since the ignition timing is retarded until backlash is taken up after the transition to an accelerating state, it requires time for the backlash to be taken up. In addition, since the ignition timing is gradually returned to normal after the retarding, the acceleration is relatively slow for the throttle opening degree. As a result, although the acceleration shock can be reduced, the engine response seems to be slow in comparison with a state where the above-described control is not performed.

SUMMARY AND OBJECTS OF THE INVENTION

In this respect, an object of an embodiment of the present invention is to provide an acceleration shock reduction control system for a vehicle, in which the above-described problems associated with the conventional technique are eliminated, and which can reduce, without deteriorating the acceleration response, a shock at the time of accelerating the vehicle.

For solving the above-described problems, according to an embodiment of the present invention, an acceleration shock reduction control system for vehicle is provided. The acceleration shock reduction control system includes control means which determines a transition from a decelerating state to an accelerating state, and which thus controls the ignition of an internal combustion engine to adjust the output of the engine. In the acceleration shock reduction control system, upon detecting the transition from the decelerating state to the accelerating state, the control means gives an instruction for an ignition cut which is executed, after a predetermined waiting time period (Tw), over a predetermined time period (Tr, Tr', Tr") or a predetermined number of ignition cycles. According to an embodiment of the present invention, when the transition from the decelerating state to the accelerating state is detected, the ignition cut is executed after the predetermined waiting time period over the predetermined time period or the predetermined number of ignition cycles. Accordingly, it is possible to reduce the shock at the transition to the accelerating state by promptly reducing the engine speed after play existing in the drive system of the vehicle is taken up. As a result, it is possible to reduce the shock at the transition to the accelerating state without deteriorating the acceleration response.

In the above-described configuration, it is preferable that the acceleration shock reduction control system further include a throttle opening degree sensor which detects a throttle opening degree, and that the transition from the decelerating state to the accelerating state be determined from an output of the throttle opening degree sensor. According to this configuration, the transition from the decelerating state to the accelerating state is determined from the output of the throttle opening degree sensor. This makes it possible to detect the operation of the driver (rider) at an earlier stage, and also to apply the present invention to an existing configuration without making any modification thereon. As a result, an inexpensive acceleration shock reduction control system can be obtained.

In the above-described configuration, it is preferable that the acceleration shock reduction control system further include revolution sensors which detect the number of rotations of a counter shaft and the number of rotations of a crankshaft, respectively, and that it be determined that the waiting time period elapses, when the difference in the number of rotations between the counter shaft and the crankshaft reaches a predetermined threshold. According to this configuration, it is possible to control, with a higher precision, the reduction in the shock at the transition to the acceleration by utilizing existing sensors. Moreover, the need for a map of the waiting time period can be eliminated.

In the above-described configuration, it is preferable that the acceleration shock reduction control system further include a map of the throttle opening degree and the engine speed for determining a threshold which divides a large throttle-opening region and a small throttle-opening region, and that the transition from the decelerating state to the accelerating state be determined from a change in the throttle opening degree with respect to the predetermined threshold. According to this configuration, it is possible to detect, with a high precision, the transition from the decelerating state to the accelerating state without using a speed sensor. As a result, it is possible to apply the present invention to a vehicle having no speed sensor mounted thereon.

In the above-described configuration, it is preferable that the acceleration shock reduction control system further include a gear-position sensor which detects a current gear position, and that a plurality of thresholds be used depending on a current gear position detected by the gear-position sensor. According to this configuration, it is possible to set a threshold more appropriately than otherwise. As a result, it is possible to reduce the shock with a high precision.

In the above-described configuration, it is preferable that different time periods for the ignition cut be set in conjunction with ranges of engine speed, and with the gear positions. According to this configuration, it is possible to set an appropriate time period for the ignition cut in accordance with a range of engine speed, and with a gear position. As a result, it is possible to reduce the acceleration shock with a high precision.

Furthermore, in the above-described configuration, it is preferable that an ignition timing be advanced during the waiting time period. According to this configuration, it is possible to more promptly take up the play existing in the drive system of the vehicle by advancing the ignition timing. As a result, the acceleration response can be further improved.

According to an embodiment of the present invention, when the transition from the decelerating state to the accelerating state is detected, the ignition cut is executed after the predetermined waiting time period over the predetermined time period or the predetermined number of ignition cycles. Accordingly, it is possible to reduce the shock at the transition to the accelerating state without deteriorating the acceleration response.

In addition, the transition from the decelerating state to the accelerating state is determined from the output of the throttle opening degree sensor. Accordingly, it is possible to detect the operation of the driver (rider) at an earlier stage, and also to apply the present invention to an existing configuration without making any modification thereon. As a result, an inexpensive acceleration shock reduction control system can be achieved.

Moreover, the acceleration shock reduction control system according to the present invention includes revolution sensors which detect the number of rotations of the counter shaft and the number of rotations of the crankshaft, respectively. Whether or not the waiting time period elapses is thus determined from the fact that the difference in the number of rotations between the counter shaft and the crankshaft reaches a predetermined threshold. Accordingly, it is possible to control, with a higher precision, the reduction in the shock at the transition to the accelerating state by utilizing existing sensors. Moreover, the need for a map of the waiting time period can be eliminated.

Furthermore, the acceleration shock reduction control system according to the present invention includes a map of the throttle opening degree and the engine speed for determining a threshold which divides a large throttle-opening region and a small throttle-opening region. The transition from the decelerating state to the accelerating state is thus determined from a change in the throttle opening degree with respect to the predetermined threshold. Accordingly, it is possible to apply the present invention to a vehicle having no speed sensor mounted thereon.

In addition, the acceleration shock reduction control system according to the present invention includes a gear-position sensor which detects a current gear position. Moreover, a plurality of thresholds are used depending on the current gear position detected by the gear-position sensor. Accordingly, it is possible to set a threshold more appropriately than otherwise. As a result, it is possible to reduce the shock with a high precision.

Moreover, different time periods for the ignition cut are set in conjunction with ranges of engine speed, and with the gear positions. Accordingly, it is possible to set an appropriate time period for the ignition cut in conjunction with a range of engine speed, and with a gear position. As a result, it is possible to reduce the acceleration shock with a high precision.

Furthermore, the ignition timing is advanced during the waiting time period. Accordingly, it is possible to more promptly take up the play existing in the drive system of the vehicle. As a result, the acceleration response can be further improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a view showing the arrangement of sensors and the like;

DETAILED DESCRIPTION OF THE PREFERRED EMBODIMENTS

Hereinafter, descriptions will be given of embodiments of the present invention with reference to the attached drawings. Note that, in the descriptions, the front, rear, left, right, up, and down directions are of a vehicle body.

Figure 1:
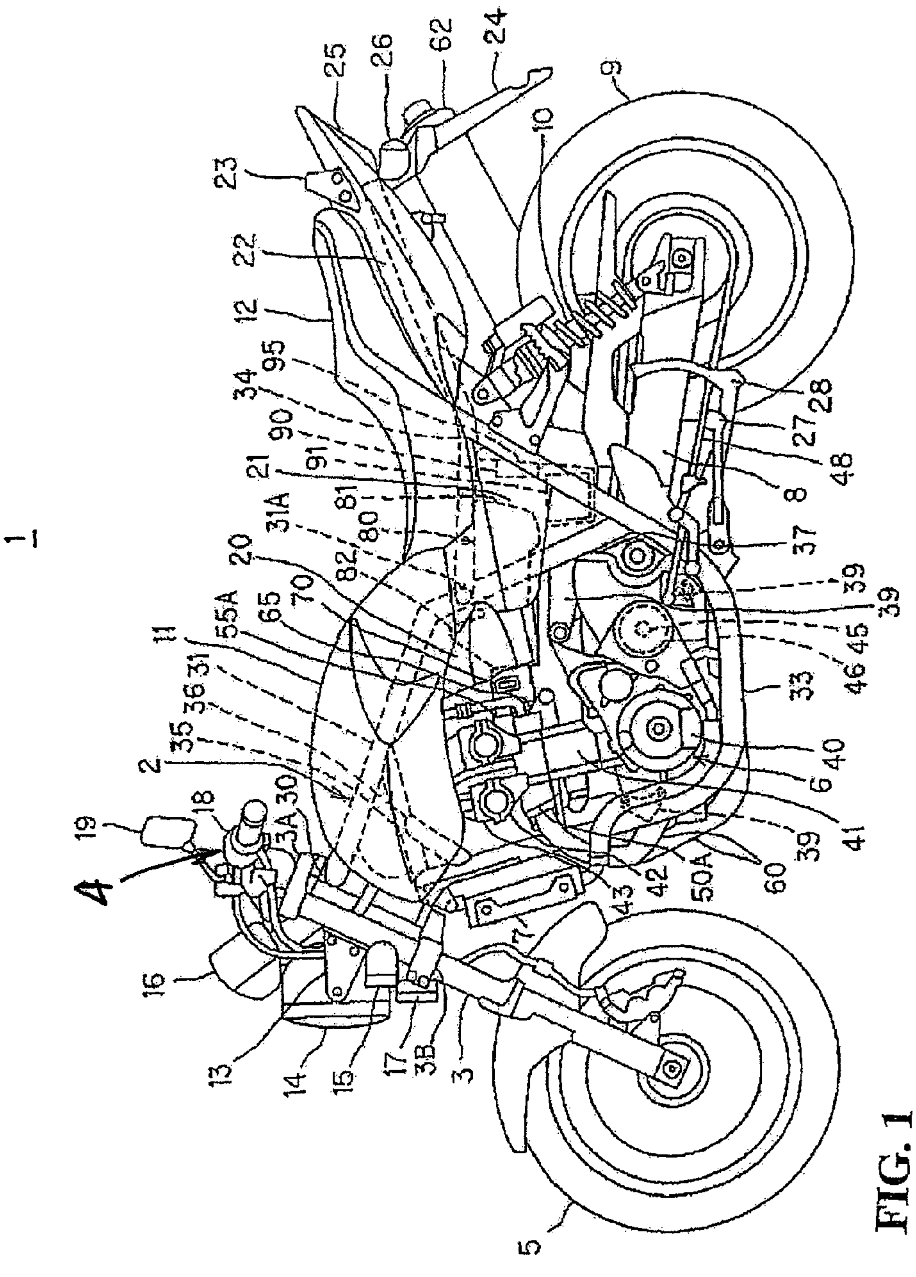
FIG. 1 is a side view showing an overall configuration of a motorcycle according to a first embodiment.

FIG. 1 is a side view showing an overall configuration of a motorcycle according to a first embodiment. The motorcycle 1 includes a vehicle body frame 2, a pair of left and right front forks 3, a steering handlebar 4, a front wheel 5, an engine (internal combustion engine) 6, a radiator 7, swing arms 8, a rear wheel 9, a pair of left and right rear cushions 10, a fuel tank 11, and a seat 12. The front forks 3 are rotatably supported by a head pipe 30 disposed on a front portion of the vehicle body frame 2. The handlebar 4 is attached to a top bridge 3A which supports the upper ends of the front forks 3. The front wheel 5 is rotatably supported by the front forks 3. The engine 6 is supported by the vehicle body frame 2 at substantially the center of the vehicle body. The radiator 7 is disposed on the front side of the engine 6. The swing arms 8 are supported by the rear end of the engine 6 and the vehicle body frame 2 to be swingable up and down. The rear wheel 9 is rotatably supported by rear end portions of the swing arms 8. The rear shock absorbers 10 are disposed between rear portions of the swing arms 8 and the vehicle body frame 2. The fuel tank 11 is disposed in the upper portion of the vehicle body frame 2, while the seat 12 is disposed on the rear side of the fuel tank 11.

A bracket 13 is attached between the top bridge 3A and a bottom bridge 3B, which both support the front forks 3. A headlight 14, turn signals 15, meters 16 and horns 17 are attached to the bracket 13, while a switch box 18 and rearview mirrors 19 are attached to the handlebar 4.

In addition, an air-cleaner side cover 20, a side cover 21, a rear cowl 22, a grab rail 23, and a rear fender 24 are attached to the vehicle body frame 2. A tail light 25, and turn signals 26 are attached to the rear fender 24. A side stand 27 and a main stand 28 are attached to lower portions of the vehicle body frame 2.

The vehicle body frame 2 includes a pair of left and right main pipes 31, a pair of left and right down tubes 33, as well as a pair of left and right seat rails 34. The main pipes 31 extend from a head pipe 30 toward the rear side of the vehicle body, and are then bent to further extend obliquely toward the lower side of the vehicle body. The down tubes 33 extend from the head pipe 30 below the main pipes 31 toward the lower side of the vehicle body, and are then further extend toward the rear side of the vehicle body. The seat rails 34 are supported, at the front ends thereof, by a cross member 31A which is disposed in the middle of the main pipes 31. The seat rails 34 also extend from the cross member 31A toward the rear side of the vehicle body.

The vehicle body frame 2 further includes a pair of left and right reinforcing frames 35 as well as a pair of left and right reinforcing frames 36. The reinforcing frames 35 link the head pipe 30 to the main pipes 31, while the reinforcing frames 36 link the reinforcing frames 35 to the corresponding down tubes 33. The rigidity of the vehicle body frame 2 is further enhanced by these reinforcing frames 35 and 36.

The rear ends of the main pipes 31 are joined respectively to the down tubes 33. A pair of left and right pivot plate portions 37 are joined to the main pipes 31 and the down tubes 33 at the portions where the main pipes 31 and the down tubes 33 are joined to each other. The pivot plate portions 37 pivotally lock the swing arm 8, which support the rear wheel 9.

In addition, the rear ends of the down tubes 33 are joined respectively to the seat rails 34. The seat rails 34 support the seat 12, the rear cowl 22, and the like. Note that, other cross members are arranged on the vehicle body frame 2 as appropriate in addition to the cross member 31A, so that an appropriate frame rigidity is secured by these cross members and the like.

Plural engine hangars 39 are provided to the main pipes 31 and the down tubes 33, so that the engine 6 is supported with the engine hangars 39.

The engine 6 is thus supported in a space surrounded by the main pipes 31 and the down tubes 33. The engine 6 includes a crankcase 40, a cylinder block 41, a cylinder head 42, and a head cover 43. The cylinder block 41 extends substantially upwardly from the front portion of the crankcase 40. The cylinder head 42 is joined to the upper portion of the cylinder block 41, while the head cover 43 is joined to the upper portion of the cylinder head 42. The engine 6 is a multi-cylinder (4-cylinder) in-line engine including 4 cylinders arranged in a row in the cylinder block 41.

In the cylinder block 41, a piston is housed to reciprocate in each of the cylinders. In the crankcase 40, a crankshaft, a counter shaft, an output shaft (main shaft) 45 and the like are axially supported, while the crankshaft is coupled to the pistons with connecting rods. In addition, in the crankcase 40, a power transmission mechanism (clutch mechanism) and a transmission mechanism are housed. The power transmission mechanism connects and disconnects between the crankshaft and the counter shaft.

As shown in FIG. 1, sprockets 46 and 47 are provided respectively to the output shaft 45 and the rear wheel 9. The power of the engine 6 is transmitted to the rear wheel 9 with a drive chain 48 looped between these sprockets 46 and 47. Note that, the motorcycle 1 of this embodiment is provided with a 6-forward-speed transmission system.

Figure 2:
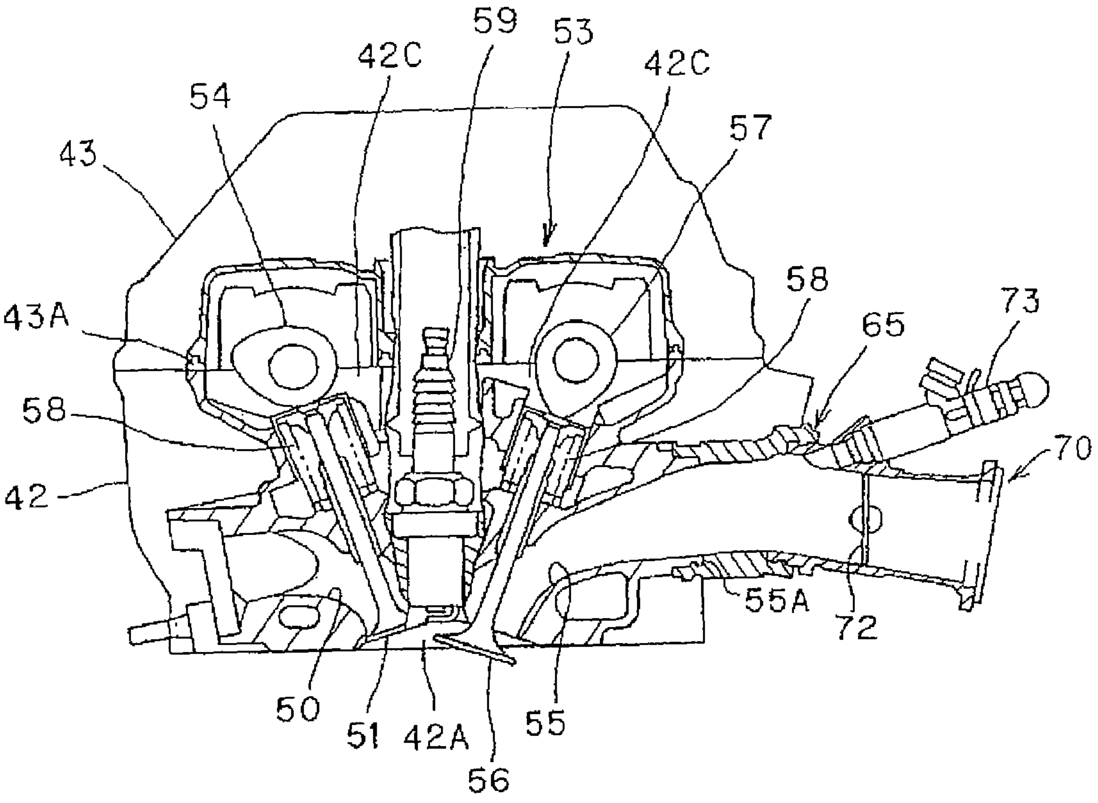
FIG. 2 is a side cross-sectional view showing a cylinder head and the peripheral configuration thereof.

In the cylinder head 42, as shown in FIG. 2, combustion chambers 42A, exhaust ports 50, and intake ports 55 are formed. The top of the piston housed in each cylinder of the engine 6 faces the corresponding one of the combustion chambers 42A. Each of the exhaust port 50 communicates with the corresponding one of the combustion chambers 42A, and opens from the front side of the cylinder head 42.

Each port 50 and each port 55 are provided respectively with an exhaust valve 51 and the intake valve 56 which open and close the corresponding ports 50 and 55. A valve mechanism 53, which drives the exhaust valves 51 and the intake valves 56 to be opened and closed, is disposed in a valve chamber 42C formed in the upper portion of the cylinder head 42. The upper opening of the valve chamber 42C is blockaded by a head cover 43 with a gasket 43A.

The valve mechanism 53 includes exhaust cams 54 and intake cams 57, which rotate in association with the rotation of the crankshaft. The exhaust valves 51 and the intake valves 56 are biased in the closing directions by valve springs 58. The exhaust cams 54 and the intake cams 57 press down the exhaust valves 51 and the intake valves 56, respectively, to open the corresponding valves 51 and 56. The ports 50 and 55 are thus caused to communicate with the combustion chamber 42A. When the cams 54 and 57 stop pressing, the valves 51 and 56 are closed by reactive force to cut off the communication between the corresponding port 50 and the combustion chamber 43A, and the communication between the corresponding port 55 and the combustion chamber 43A, respectively. In addition, ignition plugs (spark plugs) 59, each of which ignites an air-fuel mixture supplied to the inside of the combustion chamber 42A, are attached to the cylinder head 42.

As shown in FIG. 1, an exhaust pipe 60 is connected to an exhaust opening 50A of each exhaust port 50. Each of the exhaust pipes 60 extends from the exhaust opening 50A to the lower side of the vehicle body, and then extends to the rear side of the vehicle body below the crankcase 40 to be connected to an exhaust manifold pipe. The exhaust pipes 60 are thus connected to a muffler 62 with the exhaust manifold pipe in between. On the other hand, as shown in FIG. 2, a throttle body 70 is connected to an intake opening of each intake port 55 with an insulator (pipe) 65 in between. Moreover, an air cleaner 80 (see FIG. 1) is contiguously disposed on the rear side of the throttle body 70.

As shown in FIG. 2, throttle valves 72, which open and close the respective intake ports 55, are disposed on the throttle body 70. Each of the throttle valves 72 opens and closes the corresponding intake port 55 in accordance with the throttle operation of the rider. As a result, the amount of intake air to be supplied from the air cleaner 80 to the corresponding cylinder of the engine 6 is controlled.

In addition, injectors (fuel injection devices) 73 are attached to the throttle body 70 in a manner of facing the respective intake ports 55. Fuel in the fuel tank 11 is supplied to each injector 73 via a fuel pump.

Figure 3:
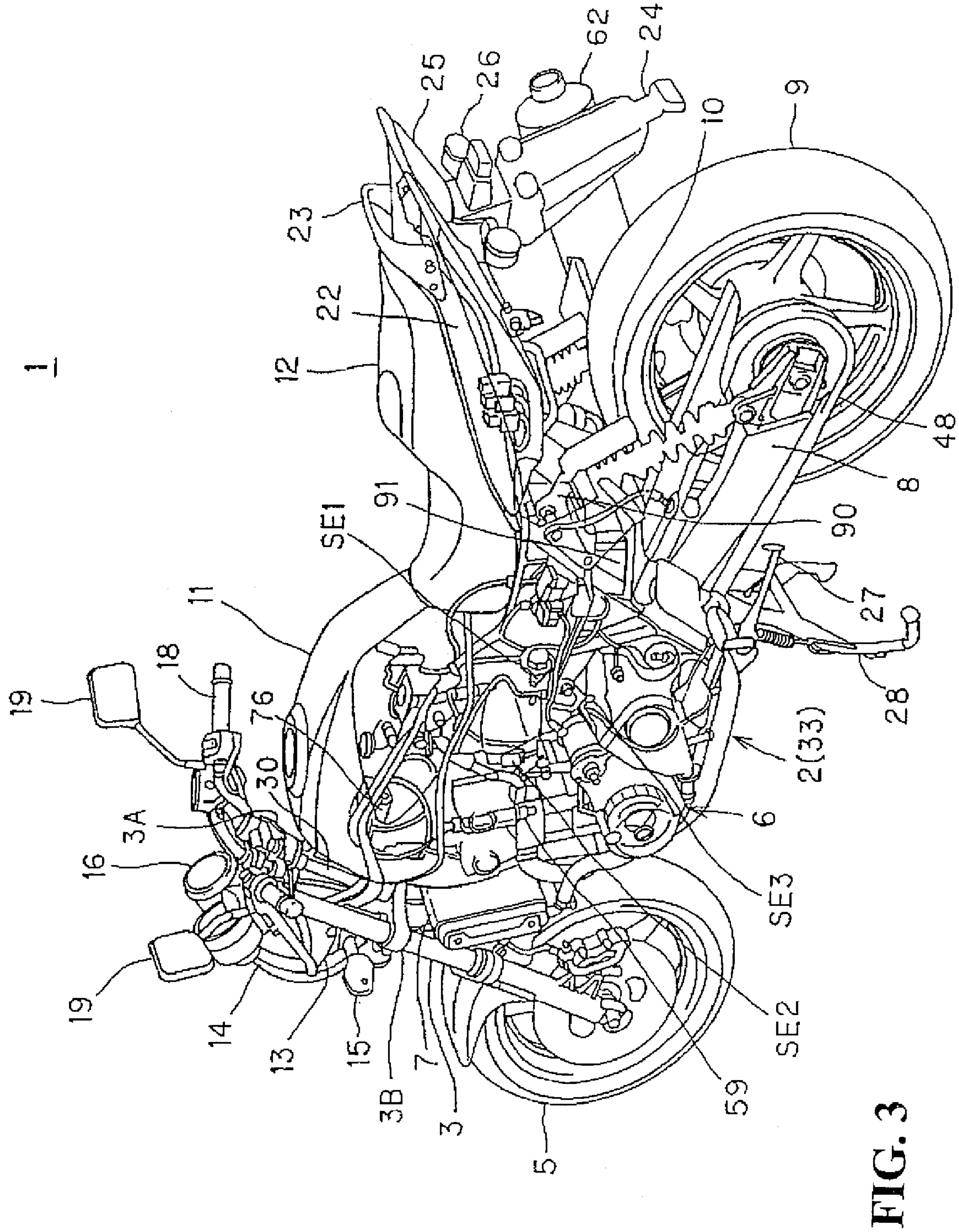

As shown in FIG. 3, throttle sensors (throttle opening degree sensors) SE2 are attached to the throttle body 70. Each throttle sensor SE2 detects the opening degree (throttle opening degree) of the corresponding throttle valve 72 (see FIG. 2) provided in an intake passage of the engine 6. The detection result of the throttle sensor SE2 is outputted to a control unit (ECU) 90 (see FIG. 1). In accordance with the throttle opening degree, the control unit 90 controls the amount of fuel injection of each injector 73. As a result, the mixture of fuel and air, that is, the air-fuel mixture is supplied from the throttle body 70 to the engine 6.

As shown in FIG. 1, the air cleaner 80 includes an outside-air introducing portion 81 and a cleaned-air portion 82. Outside air is introduced into the outside-air introducing portion 81. The outside-air introducing portion 81 cleans the outside air with an air filter incorporated in the outside-air introduction section 81, and then supplies the cleaned air to the cleaned-air portion 82. The throttle body 70 is joined to the cleaned-air portion 82, and the cleaned air stored in the cleaned-air portion 82 is supplied to the engine 6 with a negative pressure in the cylinders of the engine 6. The cleaned-air portion 82 here has a capacity in which a required amount of air for the engine 6 can be stored, and functions also as a surge tank which absorbs an intake air pulsation.

Figure 4:
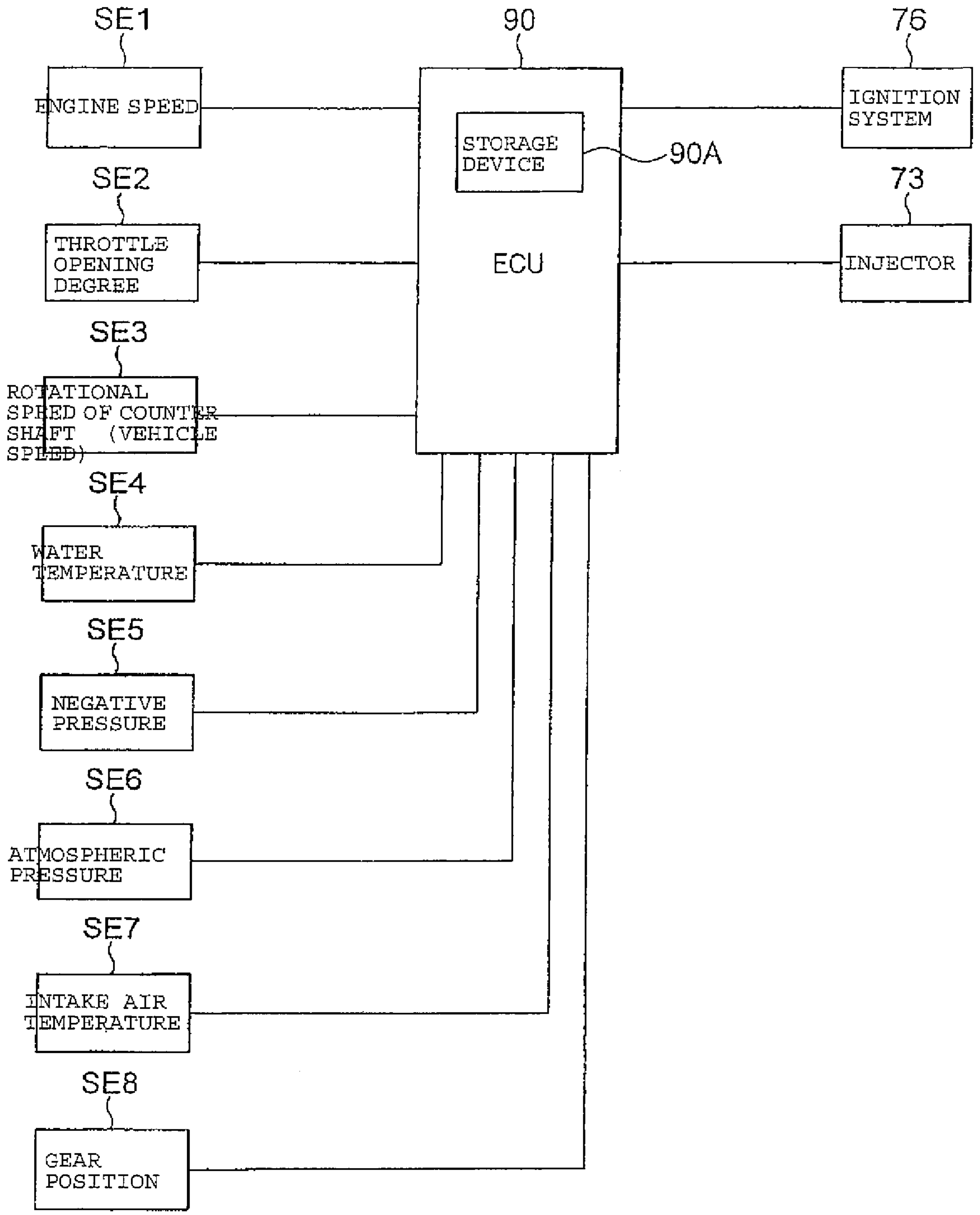
FIG. 4 is a block diagram showing a control unit and the peripheral configuration thereof.

A housing case 95, in which a battery 91 and the control unit 90 are house, is arranged on the rear side of the air cleaner 80. The control unit 90 is referred also to a PGM-FI (electronically controlled fuel injection system)/IGN unit. As shown in FIG. 4, electronic components, such as various sensors, which are provided to the motorcycle 1, are wired to the control unit 90.

As shown in FIG. 3, the motorcycle 1 is provided with a rotational-speed sensor (crankshaft pulse generator) SE1 which detects an engine speed (the number of rotations of the crankshaft), a throttle sensor (throttle opening degree sensor) SE2 which detects the throttle opening degree, a speed sensor (rotational-speed sensor) SE3 which detects the number of rotations of the counter shaft (corresponding to the vehicle speed), an ignition system (ignition coil) 76 and the like. As shown in FIG. 4, these electronic components are wired to the control unit 90. Here, the ignition system 76 applies, in accordance with an instruction from the control unit 90, a high voltage to each of the ignition plugs 59 provided to the respective cylinders of the engine 6. As a result, an arc is generated, so that the engine 6 is operated.

Moreover, the motorcycle 1 is provided with a water-temperature sensor SE4 which detects the temperature of an engine cooling water, a negative-pressure sensor SE5 which detects the negative pressure of air sucked into the engine 6, an atmospheric-pressure sensor SE6 which detects an atmospheric pressure, an intake-air-temperature sensor SE7 which detects the temperature of the intake air of the engine 6 and a gear-position sensor SE8 which detects the current gear position. These sensors are also wired to the control unit 90.

The control unit (control means) 90 includes a storage device 90A in which various data including program data, a map, and the like are stored. By executing the program stored in the storage device 90A, the control unit 90 controls the amount and timing of fuel injection of the injectors 73 (fuel injection control), and also controls the ignition system (ignition coil) 76, in accordance with detection results of the above-described sensors. The control unit 90 thus performs ignition control, and the like, of the engine 6.

Next, descriptions will be given of a system configuration regarding an acceleration shock reduction control (acceleration shock reduction control system).

Figure 5:
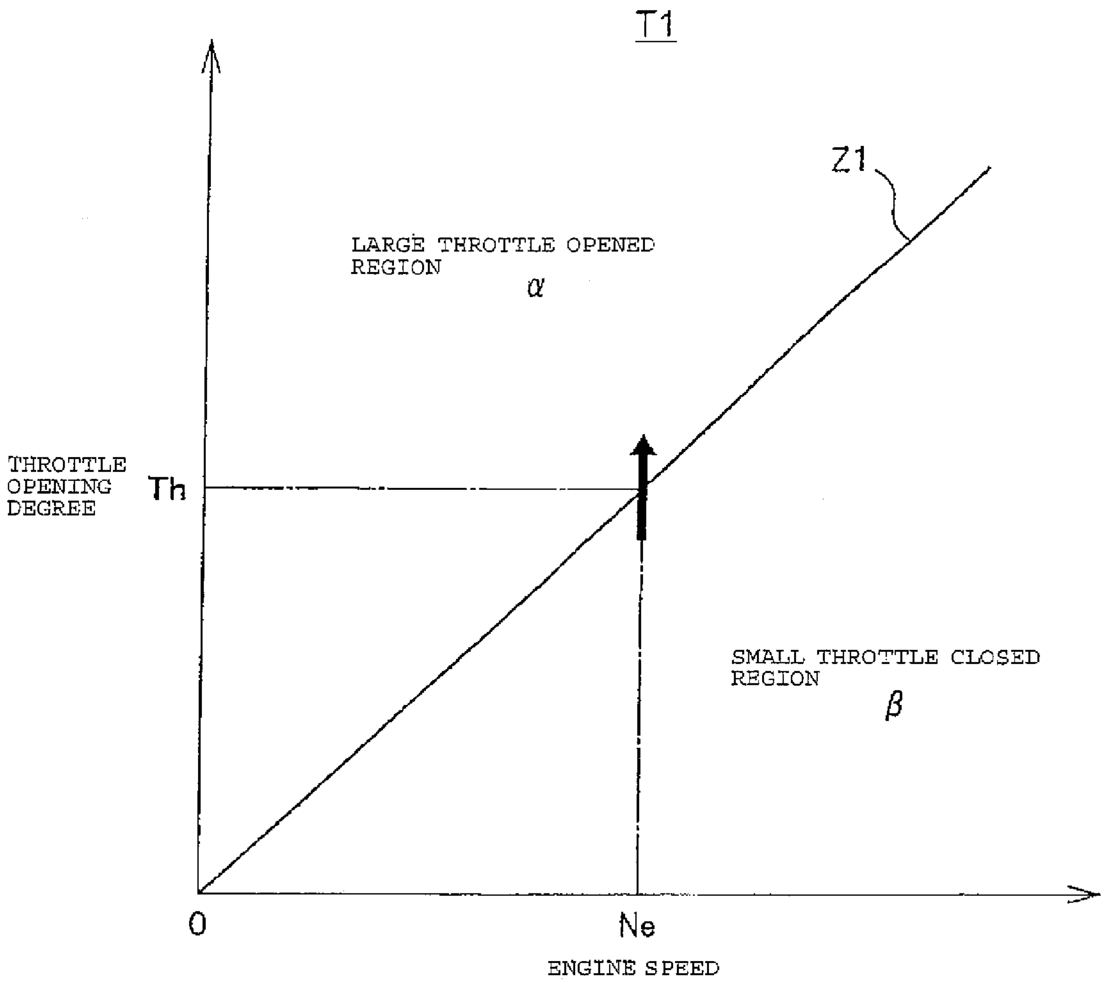
FIG. 5 is a graph showing a throttle-opening-degree.

FIG. 5 shows a throttle-opening-degree graph (map) T1, which is stored in the storage device 90A. The throttle-opening-degree graph T1 is a map in which the throttle opening degree Th and the engine speed Ne are associated with each other. A throttle-opening-degree threshold Z1 is firstly determined. When the engine speed Ne and the throttle opening degree Th are on the line of the threshold Z1, driving power is not transmitted from the crankshaft to the rear wheel 9. The throttle opening degree Th on the line of the threshold Z1 is hereinafter referred to as a "zero-horsepower opening degree." This throttle-opening-degree threshold Z1 increases in proportion to the engine speed Ne. A region where the throttle opening degree Th is above the throttle-opening-degree threshold Z1 is determined as a large throttle-opening region α. In this region α, a positive driving power is applied to the rear wheel 9 no matter whether the throttle is opened or closed during the traveling of the vehicle, so that the vehicle is accelerated. On the other hand, a region where the throttle opening degree Th is below the throttle-opening-degree threshold Z1 is determined as a small throttle-opening region β. In this region β, a negative driving power is applied to the rear wheel 9 no matter whether the throttle is opened or closed during the traveling of the vehicle, so that the vehicle is decelerated.

The throttle-opening-degree graph T1 shown in FIG. 5 includes two-dimensional data, namely, the engine speed Ne and the throttle-opening-degree threshold Z1, which are associated with each other and are employed. Alternatively, using three-dimensional data, it is possible to determine, from the engine speed Ne and the current throttle opening degree Th, whether the throttle opening degree Th is larger than the throttle-opening-degree threshold Z1 (the current throttle opening degree Th is in the large throttle-opening region α) or smaller than the throttle-opening-degree threshold Z1 (the current throttle opening degree Th is in the small throttle-opening region β). When the two-dimensional data are employed, the throttle-opening-degree threshold Z1 is firstly determined from a current engine speed Ne. Then, by comparing a current throttle opening degree Th with this threshold Z1, it is possible to determine whether the current throttle opening degree Th is in the large throttle-opening region α or in the small throttle-opening region β. In this case, it is preferable that the throttle-opening-degree threshold Z1 be determined in conjunction not only with the engine speed Ne, but also with each of the gear positions. The setting in this manner enables to precisely determine the throttle-opening-degree threshold Z1, which is the "zero-horsepower opening degree" for each of ranges of various engine speeds Ne as well as for each of the gear positions.

Suppose a case where the throttle opening degree Th increases, for example as indicated by the thick arrow in FIG. 5, from the small throttle-opening region β to the large throttle-opening region α during the traveling of the vehicle. In this case, the driving power applied to the rear wheel 9 changes from a negative driving power to a positive driving power, so that the state of the vehicle transitions from a decelerating state to an accelerating state. During the transition from the decelerating state to the accelerating state, each component may possibly move from one side to the other within the range of play (backlash or the slack of the drive chain 48) existing in the drive system of the vehicle. As a result, what is termed as an acceleration shock may act on the vehicle.

In this embodiment, for the purpose of reducing the acceleration shock, the control unit 90 determines whether or not the state of the vehicle transitions from the decelerating state to the accelerating state, from the output of the throttle sensor SE2. When detecting the transition to the accelerating state, the control unit 90 cuts off the ignition for a predetermined executing time period (ignition-cut executing time period) Tr after a predetermined waiting time period Tw elapses.

Figure 6:
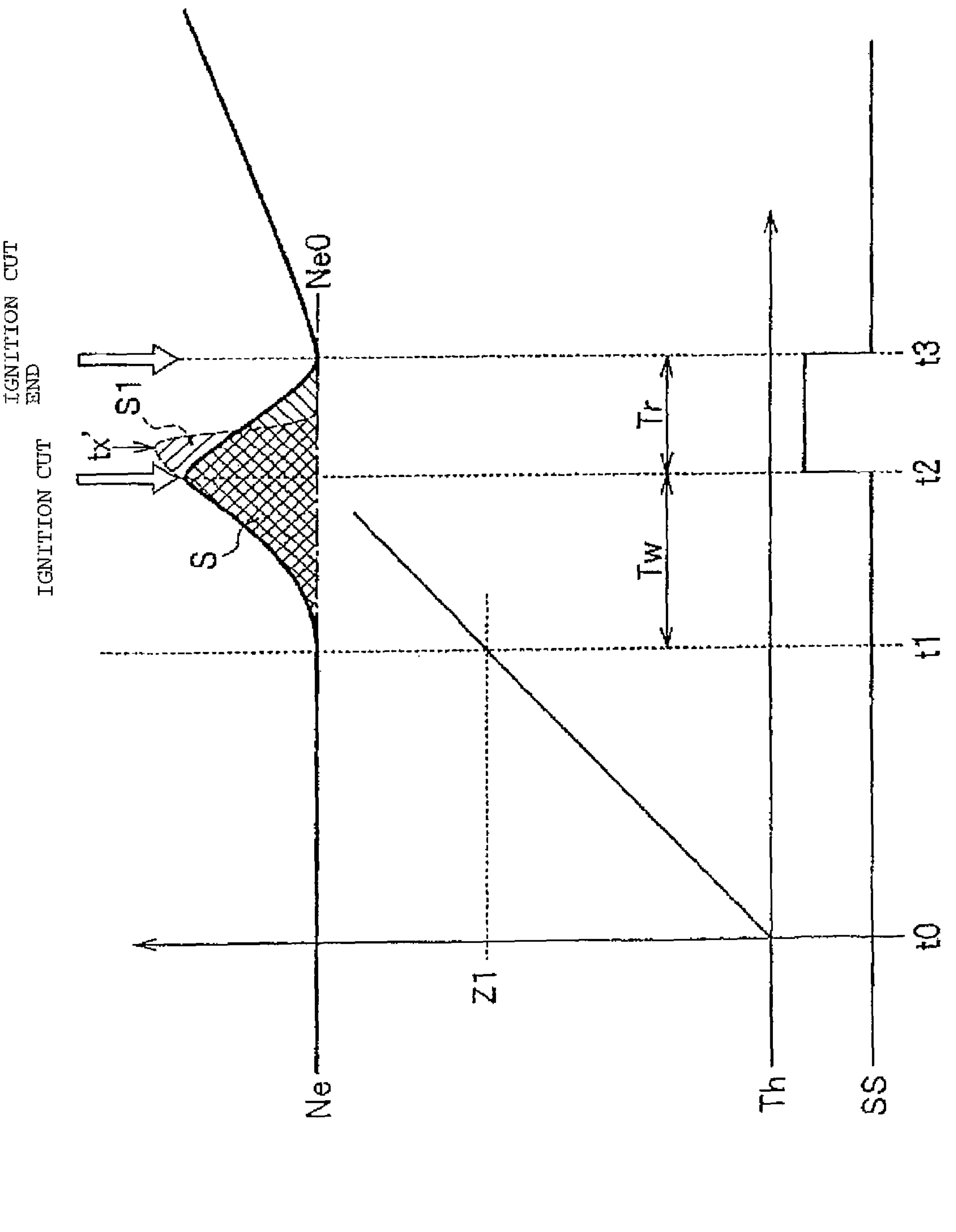
FIG. 6 is a graph showing an acceleration shock reduction control.

FIG. 6 shows the acceleration shock reduction control.

To be specific, FIG. 6 shows the following example. From a state where the engine speed Ne is increased to a predetermined speed, the throttle opening degree Th is once reduced (a deceleration state). Thereafter, the throttle is operated at a timing t0 to again increase the throttle opening degree Th. At a timing t1 when the throttle opening degree Th reaches the throttle-opening-degree threshold Z1 (see FIG. 5) due to the increase, the counting of the waiting time period Tw is started. At a timing t2 when this waiting time period Tw elapses, the signal level of a control signal SS to the ignition system 76 (see FIG. 4) is raised. Accordingly, the ignition operation of the ignition system 76 is stopped, so that the ignition cut starts.

Then, at the timing t2 when the ignition cut starts, the counting of the executing time period Tr is started. At a timing t3 when the executing time period Tr elapses, the signal level of the control signal SS is decreased. Accordingly, the ignition operation of the ignition system 76 is restarted, so that the ignition cut ends.

Since the ignition operation is continued during the waiting time period Tw, the engine speed Ne can be increased more promptly than a case where the ignition operation is retarded. On the other hand, since the ignition operation is stopped during the ignition-cut executing time period Tr, the engine speed Ne can be decreased promptly. With this configuration, the ignition operation is stopped between the timings t2 and t3, and is then operated again under the normal ignition control. Since the time for which the ignition is stopped is very short, the fuel injection may be continued during the ignition cut. It is further preferable to stop also the fuel injection (fuel cut) during the ignition cut.

If the acceleration shock reduction control is not executed, the ignition operation is continued without performing the ignition cut. Accordingly, as indicated by the dashed line in FIG. 6, the engine speed Ne continues to increase until a timing tx' at which the play (backlash) existing in the drive system of the vehicle is taken up.

Then, at the timing tx' when the play existing in the drive system of the vehicle is taken up, the engine speed Ne is forced to decrease to the aforementioned speed Ne0. In this case, the so-called acceleration shock at the time of the transition to the accelerating state occurs. An area S1, which is indicated by the hatching surrounded by the dashed line in FIG. 6, represents an amount of traveling required for taking up the play existing in the drive system of the vehicle.

In this embodiment, the waiting time period Tw and the ignition-cut executing time period Tr are set so that the engine speed Ne can be decreased to the speed Ne0, which hardly causes an acceleration shock, at the time point when the play is completely taken up (at the timing t3 when the executing time period Tr elapses). In other words, the waiting time period Tw and the ignition-cut executing time period Tr are set so that the area S, which is indicated by the hatching surrounded by the dashed line in FIG. 6, can be equal to an S1 that is indicated by the hatching surrounded by the solid line in FIG. 6. According to this setting, once the play is completely taken up, the engine speed Ne is reduced to Ne0. Accordingly, even if the state of the vehicle transitions to the accelerating state from this time point, the acceleration shock is hardly caused. In other words, the ignition-cut executing time period Tr is set so that the engine speed Ne that has been increased during the waiting time period Tw can be decreased to the speed Ne0, which hardly causes an acceleration shock. The waiting time period Tw is set so that the engine speed Ne can be decreased to Ne0 when the area S indicated by the hatching during the total time (Tw+Tr) reaches the amount of traveling required for taking up the play.

The control unit 90 performs a monitoring process for determining, from the output of the throttle sensor SE2, whether or not the state of the vehicle transitions from the decelerating state to the accelerating state. To be specific, the control unit 90 obtains, at predetermined cycles, the throttle opening degree Th which is detected by the throttle sensor SE2. The control unit 90 concurrently refers to the throttle-opening-degree graph (map) T1 (see FIG. 5) so as to determine the throttle-opening-degree threshold Z1 corresponding to the engine speed Ne detected by the rotational-speed sensor SE1. The control unit 90 then compares the throttle opening degree Th and the throttle-opening-degree threshold Z1 to determine whether or not the throttle opening degree Th is changed from a value smaller than the throttle-opening-degree threshold Z1 to a value larger than the throttle-opening-degree threshold Z1. In short, as shown in FIG. 6, at the timing t1 when the throttle opening degree Th becomes larger than the throttle-opening-degree threshold Z1, the control unit 90 determines that the state of the vehicle transitions from the decelerating state to the accelerating state.

Next, descriptions will be given of the relation between the waiting time period Tw and the ignition-cut executing time period Tr.

Figure 7:
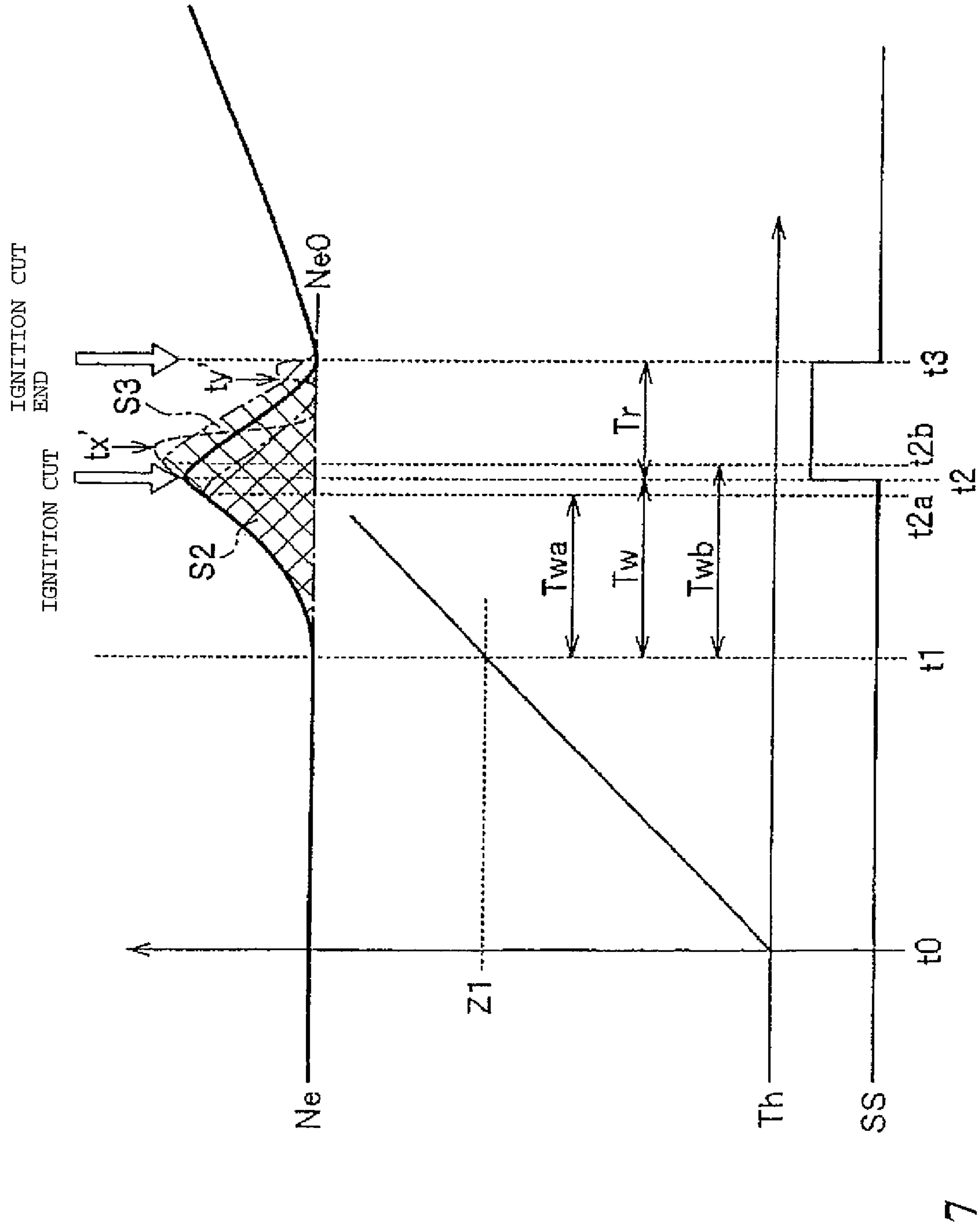
FIG. 7 is a graph for explaining a waiting time period and an ignition-cut executing time period.

Now, refer to FIG. 7, suppose a case of setting a waiting time period Twa that is shorter than the aforementioned waiting time period Tw. In this case, as indicated by the alternate long and short dash line, the ignition cut is executed at a timing t2*a* that is earlier than the aforementioned timing t2 for the engine speed Ne. Accordingly, the engine speed Ne is reduced to the speed Ne0, which does not cause an acceleration shock, before the area S2 surrounded by the alternate long and short dash line reaches an S1 corresponding to the total amount of play. For this reason, the play cannot be completely taken up during the ignition cut. Since the engine speed is increased again due to the restarting of the ignition operation, the acceleration shock eventually occurs.

On the other hand, suppose a case of setting a waiting time period Twb that is longer than the aforementioned waiting time period Tw. In this case, as indicated by the alternate long and two short dashes line, the ignition cut is executed at a timing t2*b* that is later than the aforementioned timing t2 for the engine speed Ne. Accordingly, the engine speed Ne is higher than the speed Ne0, which does not cause the acceleration shock, at a time point ty' when the area S3 surrounded by the alternate long and two short dashes line reaches the area S1 corresponding to the total amount of play. For this reason, the acceleration shock eventually occurs.

As described above, when the waiting time period is decreased or increased, it is impossible to reduce the engine speed Ne to the speed Ne0, which does not cause the acceleration shock, at a time point when the area S surrounded by the curve showing the time-variable characteristic of the engine speed Ne reaches the area corresponding to the total amount of play. In other words, the waiting time period Tw and the ignition-cut executing time period Tr are uniquely determined (see FIG. 5).

In this embodiment, the waiting time period Tw and the ignition-cut executing time period Tr that satisfy the above-described conditions are employed. Accordingly, in comparison with a case where the ignition operation is continued without performing the ignition cut, it is possible to reduce the acceleration shock more. In addition, in comparison with a case where the ignition timing of the engine 6 is retarded, it is possible to reduce the acceleration shock without delaying the total amount of time (for example, corresponding to Tw+Tr) until the start of acceleration.

The waiting time period Tw and the ignition-cut executing time period Tr can be obtained by means of, for example, an experiment or a simulation. In this embodiment, a waiting time period setting graph (map) T2 shown in FIG. 8 and an execution-time setting graph (map) T3 shown in FIG. 9 are stored beforehand in the storage device 90A of the control unit 90 so that the waiting time period Tw and the executing time period Tr that are obtained in advance can be determined.

Figure 8:
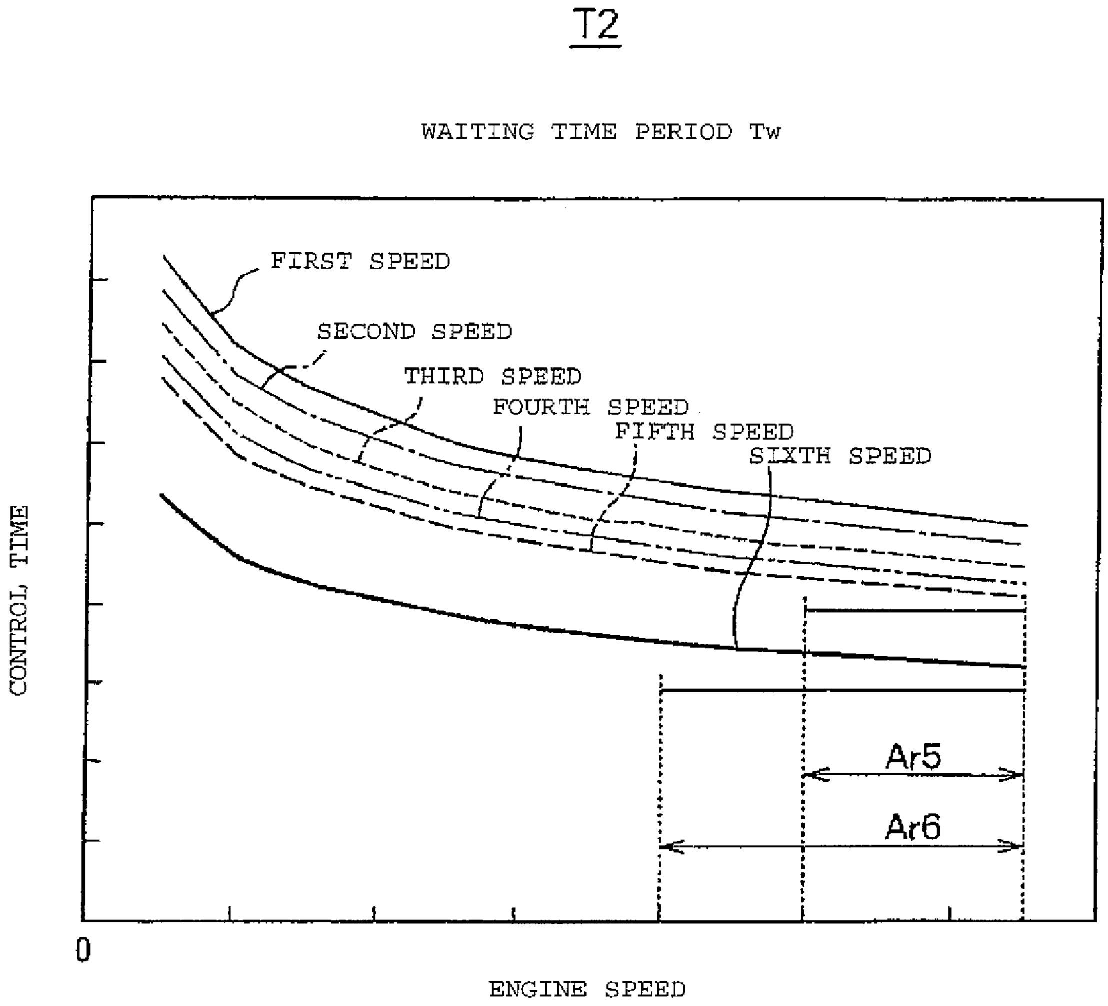
FIG. 8 is a graph showing a waiting time period setting.

As shown in FIG. 8, the waiting time period setting graph (map) T2, the engine speed Ne and the waiting time period Tw are associated with each other. On the other hand, as shown in FIG. 9, the execution-time setting graph (map) T3 the engine speed Ne and the executing time period Tr are associated with each other.

Figure 9:
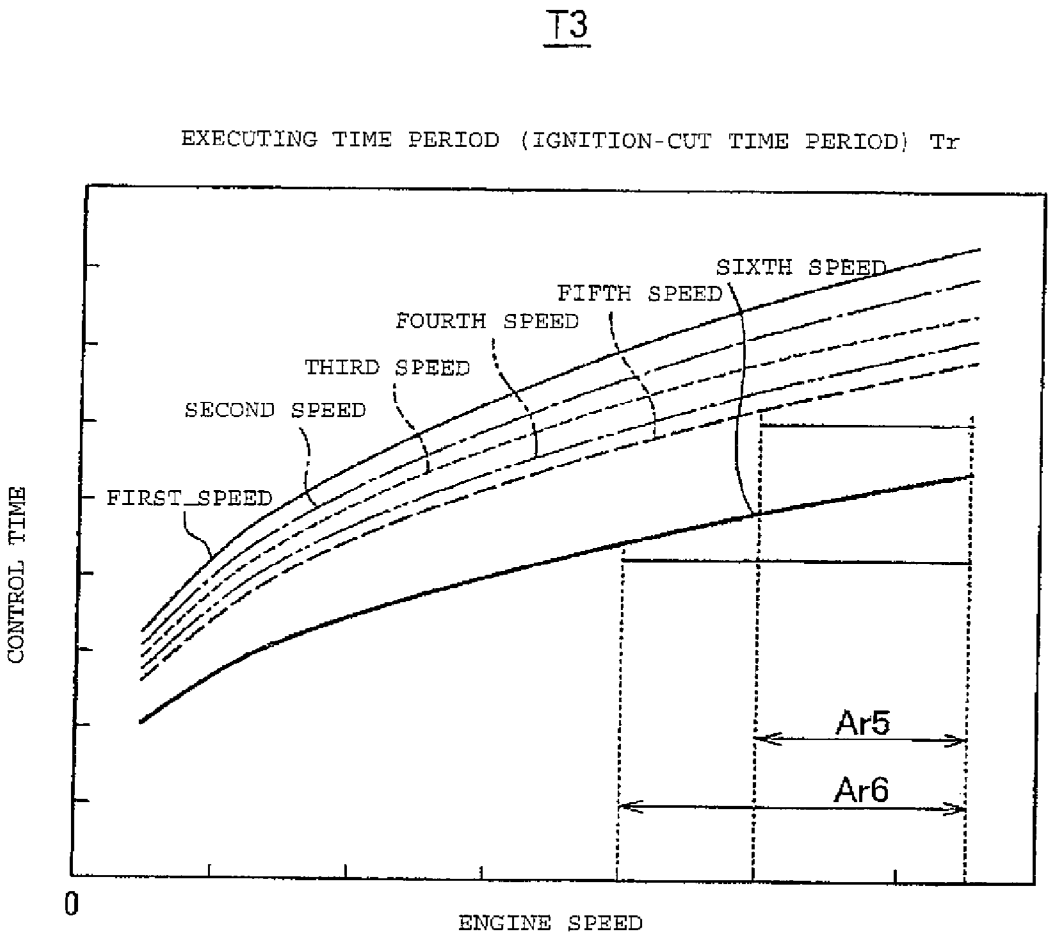
FIG. 9 is a graph showing an executing time period setting.

In this embodiment, as shown in FIGS. 8 and 9, the waiting time period Tw and the ignition-cut executing time period Tr are varied in conjunction not only with the engine speed Ne, but also with the gear positions. The waiting time period Tw and the executing time period Tr can be individually set for each of all the first to sixth speed gear positions. Accordingly, these time periods Tw and Tr can be determined appropriately for the acceleration shock reduction in conjunction with a region of the engine speed Ne as well as with each of the gear positions.

Note that, it is also possible to simplify the configuration by omitting the controlling of a high speed region of a high gear position. For example, as shown in FIGS. 8 and 9, it is possible to omit the controlling of a high speed region Ar5 when the fifth speed gear position is selected, while omitting the controlling of a high speed region Ar6 that includes a low speed area of the high speed region Ar5 when the sixth speed gear position is selected. It should be noted that the reason why the controlling of a wider high speed region is omitted when the sixth speed gear position is selected is because the acceleration shock is smaller for a higher speed area of a higher speed gear position.

In this case, as shown in FIG. 8, the waiting time period Tw is set to be shorter as the engine speed Ne is increased, and concurrently to be shorter for a higher gear position (as the gear is shifted closer to the sixth speed). On the other hand, the executing time period Tr is set to be longer as the engine speed Ne is increased, and concurrently to be shorter for a higher gear position. In this case, when the state of the vehicle transitions from the decelerating state to the accelerating state, the control unit 90 obtains the engine speed Ne from the output of the rotational-speed sensor SE1, and concurrently obtains the gear position from the output of the gear-position sensor SE8. On the basis of these obtained information, the control unit 90 determines appropriate waiting time period Tw and executing time period Tr to execute the acceleration shock reduction control.

As described above, in this configuration, when the transition from the decelerating state to the accelerating state is detected from the output of the throttle sensor SE2, the ignition cut is executed for the predetermined executing time period Tr after the predetermined waiting time period Tw elapses. Accordingly, it is possible to reduce the acceleration shock by promptly reducing the engine speed Ne after the play existing in the drive system of the vehicle is promptly taken up, in comparison with a case where the ignition timing of the engine 6 is retarded. As a result, it is possible to reduce the acceleration shock without deteriorating the acceleration response.

Moreover, in this configuration, the waiting time period Tw and the ignition-cut executing time period Tr are set in conjunction with ranges of the engine speed Ne, and with the gear positions. Accordingly, it is possible to set, with high precision, appropriate waiting time period Tw and the ignition-cut executing time period Tr. More specifically, with the waiting time period Tw and the ignition-cut executing time period Tr, the engine speed Ne can be reduced to the speed Ne0, which does not cause an acceleration shock, at the time point when the area S surrounded by the curve showing the time-variable characteristic of the engine speed Ne reaches the area corresponding to the total amount of play. For this reason, the acceleration shock can be reduced more efficiently.

In addition, in this configuration, the transition from the decelerating state to the accelerating state is determined on the basis of the throttle opening degree Th by referring to the throttle-opening-degree graph T1 in which the throttle opening degree Th and the engine speed Ne are associated with each other. Accordingly, it is possible to detect, with a high precision, the transition from the decelerating state to the accelerating state without using the speed sensor SE3. For this reason, this acceleration shock reduction control can be employed to a vehicle that is not equipped with the speed sensor SE3.

In addition, in this configuration, the transition from the decelerating state to the accelerating state is determined from the output of the throttle sensor SE2. This makes it possible to detect the operation of the driver (rider) at an earlier stage. This also makes it possible to detect the transition to the accelerating state without making any modification on the existing structure, so as to configure an inexpensive acceleration shock reduction control system.

Figure 10:
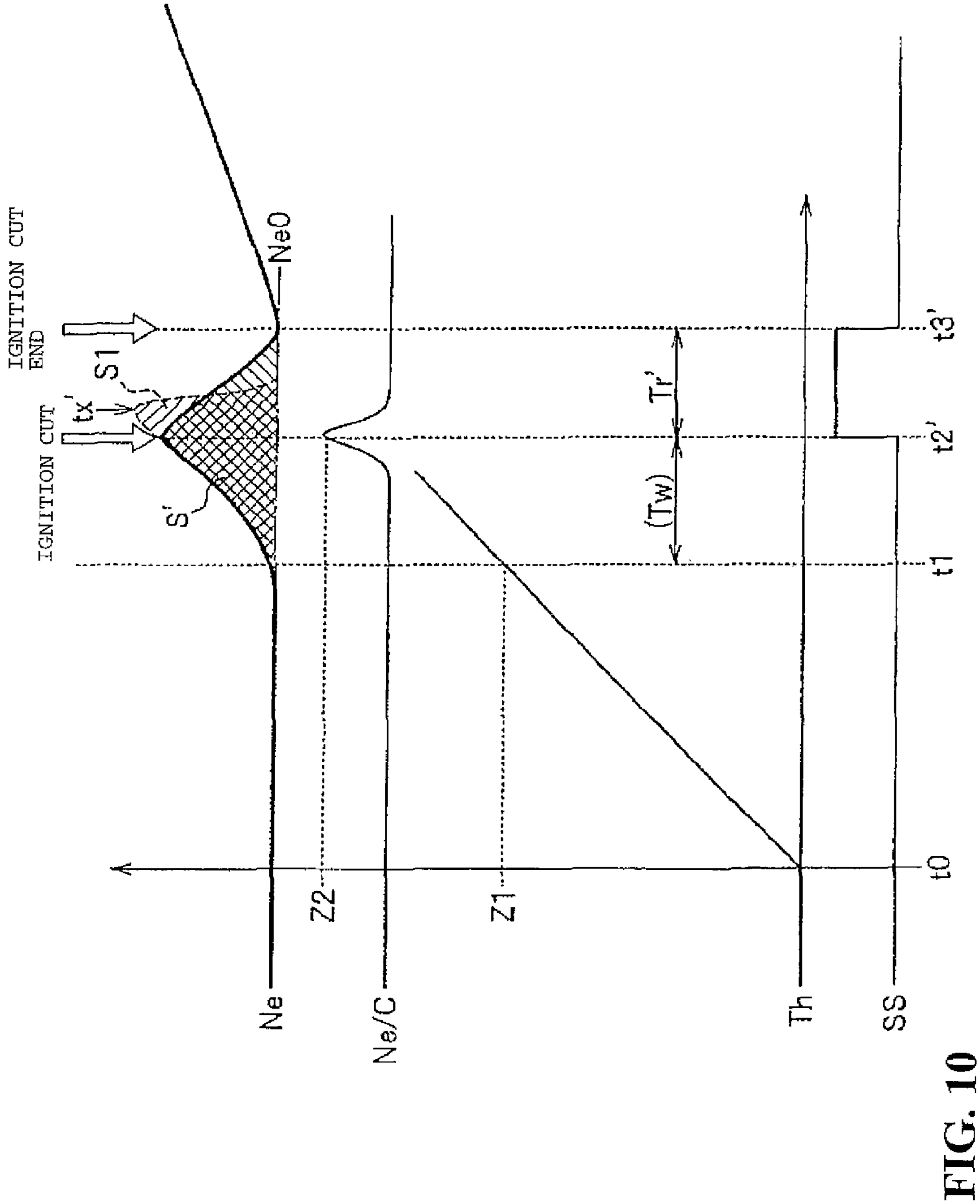
FIG. 10 is a graph showing an acceleration shock reduction control according to a second embodiment.

FIG. 10 shows an acceleration shock reduction control according to a second embodiment. In the second embodiment, a difference between an engine speed (the number of rotations of the crankshaft) Ne and the number of rotations of the counter shaft (corresponding to the vehicle speed) C is monitored. Then, an ignition cut is started at a timing t2' when the difference exceeds a predetermined threshold (hereinafter, referred to as a difference-determination threshold) Z2. Note that, since configurations of the other parts are substantially the same as those of the first embodiment, descriptions thereof will be omitted.

The control unit 90 firstly determines, from the output of the throttle sensor SE2, whether or not the state of the vehicle transitions from the decelerating state to the accelerating state. Upon determining that the throttle opening degree Th exceeds the throttle-opening-degree threshold Z1, that is, upon determining that the state of the vehicle transitions to the accelerating state (t1), the control unit 90 starts monitoring the ratio between the engine speed Ne, detected by the rotational-speed sensor SE1, and the number of rotations C of the counter shaft, detected by the speed sensor SE3 (hereinafter, the ratio will be referred to as the value Ne/C).

Under this monitoring, the control unit 90 determines whether or not the value Ne/C reaches the predetermined difference-determination threshold Z2. When the value Ne/C reaches the difference-determination threshold Z2 (t2'), the control unit 90 determines that the waiting time period elapses. The control unit 90 thus raises the signal level of a control signal SS to the ignition system 76. Accordingly, the ignition operation of the ignition system 76 is stopped, so that the ignition cut is started. In addition, when the value Ne/C reaches the difference-determination threshold Z2 (t2'), the control unit 90 start counting an executing time period Tr'. Then, at the timing t3 when the executing time period Tr' elapses, the control unit 90 decreases the signal level of the control signal SS. Accordingly, the ignition operation of the ignition system 76 is restarted, so that the ignition cut ends.

The difference-determination threshold Z2 and the ignition-cut executing time period Tr' are set, as shown in FIG. 10, to satisfy the following conditions. More specifically, with the setting, at a time point (t3') when an area S' surrounded by a curve showing the time-variable characteristic of the engine speed Ne reaches an area corresponding to the total amount of play, the engine speed Ne is reduced to the speed Ne0, which does not cause an acceleration shock.

Figure 11:
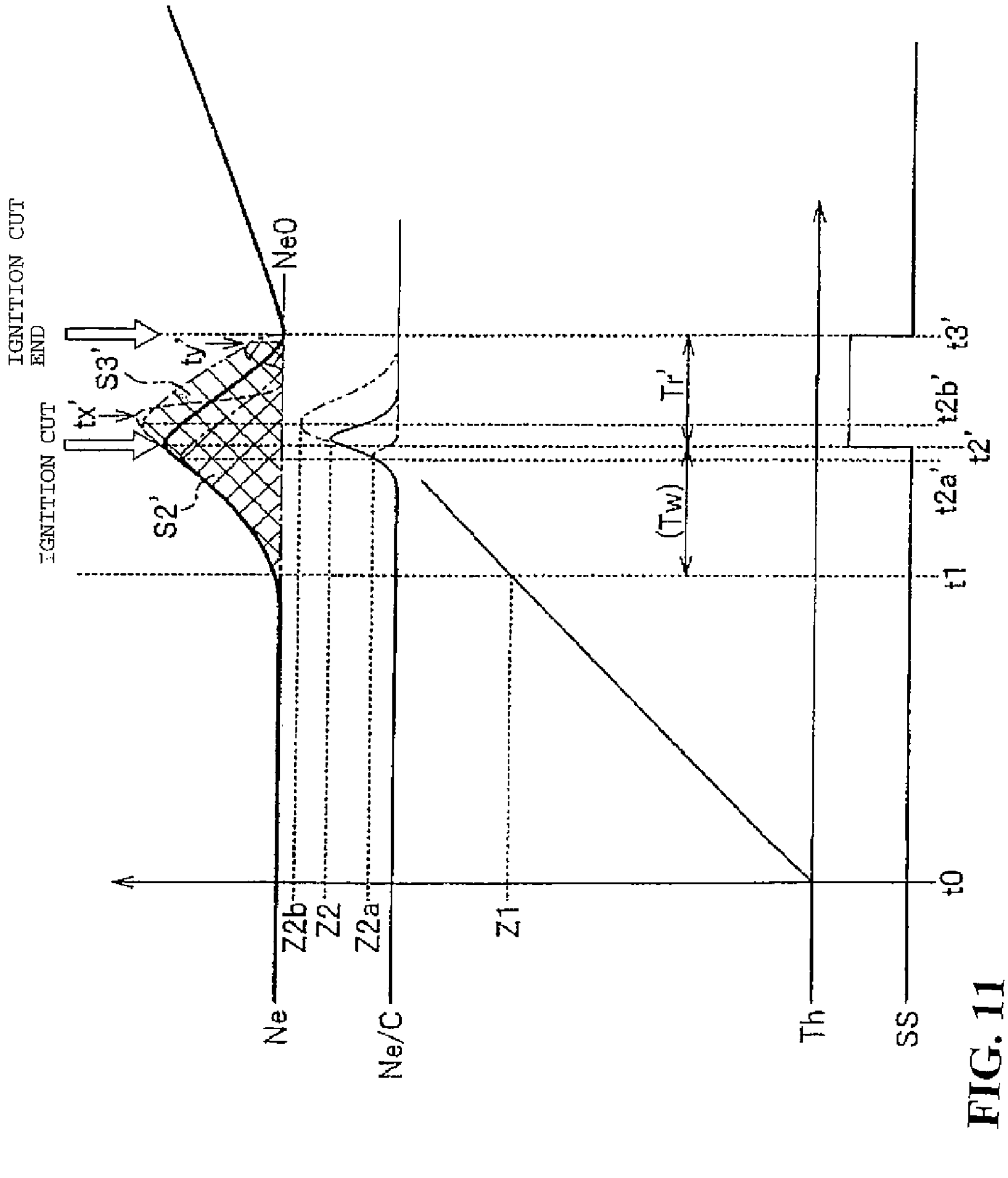
FIG. 11 is a graph for explaining a difference-determination threshold and an ignition-cut executing time period.

Now, refer to FIG. 11, suppose a case of setting a threshold Z2*a* that is smaller than the difference-determination threshold Z2. In this case, as indicated by the alternate long and short dash line, the ignition cut is executed at a timing t2*a*' that is earlier than that of the case of setting the difference-determination threshold Z2 for the engine speed Ne. Accordingly, the engine speed Ne is reduced to the speed Ne0, which does not cause an acceleration shock, before the area S2' surrounded by the alternate long and short dash line reaches an area corresponding to the total amount of play. For this reason, the play cannot be completely taken up during the ignition cut. Since the engine speed is increased again due to the restarting of the ignition operation, the acceleration shock eventually occurs.

On the other hand, suppose a case of setting a threshold Z2*b* that is larger than the aforementioned difference-determination threshold Z2. In this case, as indicated by the alternate long and two short dashes line, the ignition cut is executed at a timing t2*b*' that is later than that of the case of setting the difference-determination threshold Z2 for the engine speed Ne. Accordingly, the engine speed Ne is higher than the speed Ne0, which does not cause the acceleration shock, at a time point ty' when the area S3' surrounded by the alternate long and two dashes line reaches the area corresponding to the total amount of play. For this reason, the acceleration shock eventually occurs.

As described above, when the value of the difference-determination threshold Z2 is changed, it is impossible to reduce the engine speed Ne to the speed Ne0, which does not cause the acceleration shock, at a time point when the area S' surrounded by the curve showing the time-variable characteristic of the engine speed Ne reaches the area corresponding to the total amount of play. In other words, the difference-determination threshold Z2 and the ignition-cut executing time period Tr' are uniquely determined.

In this embodiment, the difference-determination threshold Z2 and the ignition-cut executing time period Tr that satisfy the above-described conditions are employed. Accordingly, it is possible to reduce the acceleration shock. Note that, when the difference-determination threshold Z2 satisfying the above-described conditions is set, the timing t2' when the value Ne/C exceeds the threshold Z2 is substantially equal to the timing t2 when the waiting time period Tw elapses, which is shown in the first embodiment. Concurrently, the timing t3' for the ignition cut is also substantially equal to the timing t3 in the first embodiment.

The difference-determination threshold Z2 and the ignition-cut executing time period Tr' can be obtained by means of, for example, an experiment or a simulation. In this embodiment, a map is stored beforehand in the storage device 90A so that the difference-determination threshold Z2 that is obtained in advance can be determined. In this map, the engine speed Ne and the difference-determination threshold Z2 are associated with each other. In addition, in this map, the difference-determination threshold Z2 is set to be different for each of the gear positions. This makes it possible to determine an appropriate difference-determination threshold Z2 in conjunction with the engine speed Ne, as well as with each of the gear positions so as to reduce the shock.

As described above, in this configuration, the difference-determination threshold Z2 and the ignition-cut executing time period Tr' that satisfy the above-described conditions are employed. Accordingly, during monitoring the value Ne/C from the timing t1 for the transition to the accelerating state, it is possible to promptly take up the play by continuing the ignition operation. In addition, after the value Ne/C reaches the difference-determination threshold Z2, it is possible to promptly reduce, by the ignition cut, the engine speed Ne to the speed Ne0, which hardly causes the acceleration shock by the ignition cut, and to then start acceleration. Accordingly, as in the case of the first embodiment, it is possible to reduce the acceleration shock without deteriorating the acceleration response.

Moreover, in this configuration, the existing rotational-speed sensor SE1 and the existing speed sensor SE3 are employed. Then, the ignition cut is started by determining whether or not the waiting time period elapses from the outputs of these sensors. Accordingly, it is possible to detect, with a high precision, a timing for starting the ignition cut without installing other components such as a sensor. Furthermore, since the measuring of the waiting time period is unnecessary, the map for the waiting time period Tw (the waiting time period setting graph T2), which is used in the first embodiment, is not required.

It should be noted that, the case of monitoring the ratio between the engine speed Ne and the number of rotations C of the counter shaft (the value Ne/C) has been described. However, the ratio is not limited to the value obtained by dividing the engine speed Ne by the number of rotations C of the counter shaft. Alternatively, a value obtained by dividing the number of rotations C of the counter shaft by the engine speed Ne may be employed. The point is that it is possible to employ any value as long as the difference between the engine speed Ne and the number of rotations C of the counter shaft can be determined from the value.

Figure 12:
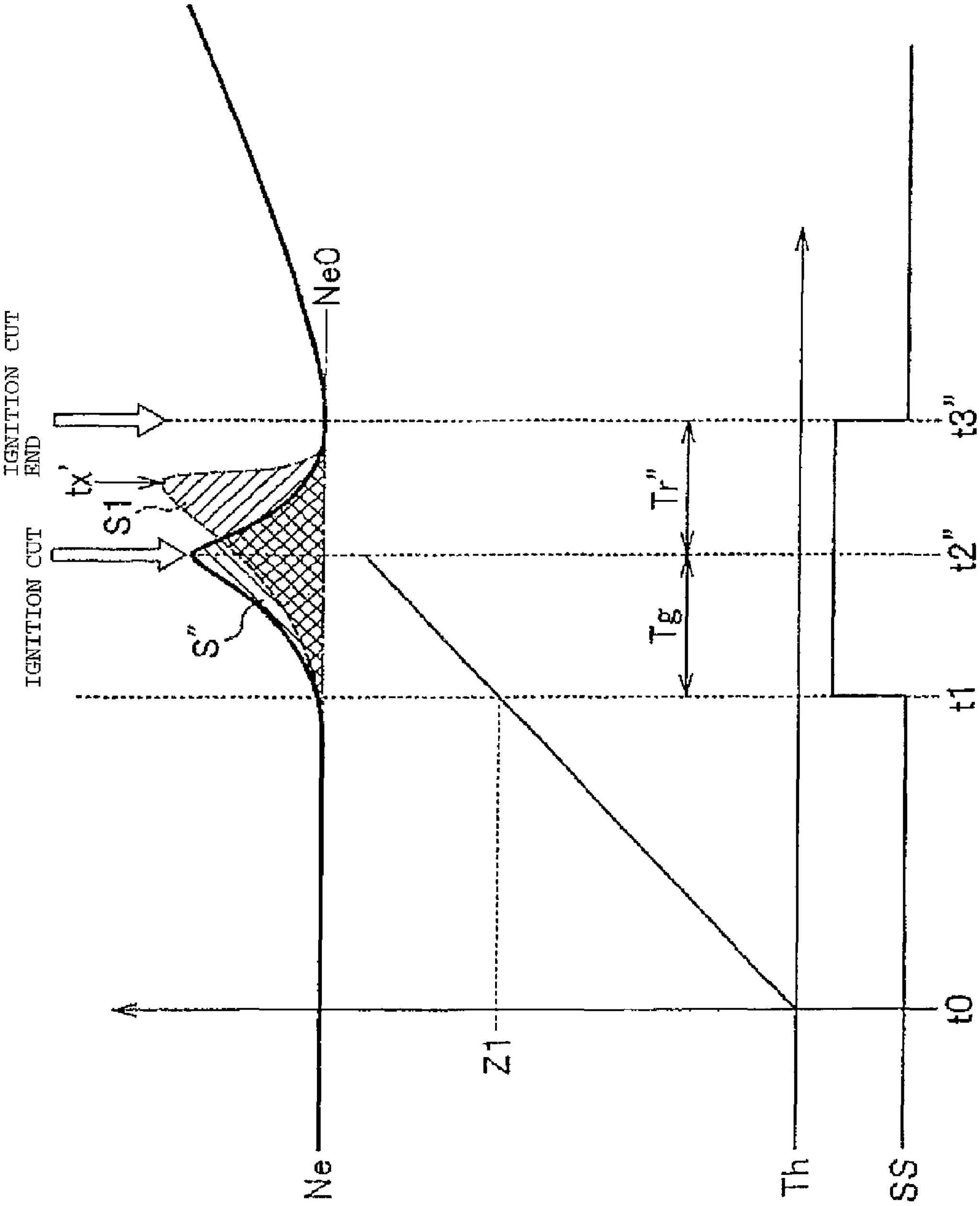
FIG. 12 is a graph showing an acceleration shock reduction control according to a third embodiment.

FIG. 12 shows an acceleration shock reduction control according to a third embodiment. In the third embodiment, when the transition from the decelerating state to the accelerating state is detected from the output of the throttle sensor SE2, the ignition timing of the engine 6 is advanced. The engine speed Ne is thus promptly increased, so that the play existing in the drive system of the vehicle is more promptly taken up. Note that, since configurations of the other parts are substantially the same as those of the first embodiment, descriptions thereof will be omitted.

The control unit 90 firstly determines, from the output of the throttle sensor SE2, whether or not the state of the vehicle transitions from the decelerating state to the accelerating state. When determining that the throttle opening degree Th exceeds the throttle-opening-degree threshold Z1, that is, when determining that the state of the vehicle transitions to the accelerating state (t1), the control unit 90 starts counting a predetermined ignition advancing time period (a waiting time period to the ignition cut) Tg. Concurrently, the control unit 90 raises the signal level of the control signal SS to the ignition system 76. Accordingly, the ignition timing of the ignition system 76 is advanced so that the play can be more promptly taken up.

Subsequently, at a timing t2" when the ignition advancing time period Tg elapses, the control unit 90 stops the ignition operation of the ignition system 76 to start the ignition cut, and concurrently starts counting an executing time period Tr". Then, at a timing t3" when the executing time period Tr" elapses, the control unit 90 decreases the signal level of the control signal SS. Accordingly, the ignition operation of the ignition system 76 is restarted, so that the ignition cut ends.

The ignition-advancing time period Tg and the ignition-cut executing time period Tr" are set, as shown in FIG. 12, to satisfy the following conditions. More specifically, with the setting, at a time point (t3") when an area S" surrounded by a curve showing the time-variable characteristic of the engine speed Ne reaches an area S1 corresponding to the total amount of play (t3"), the engine speed Ne is reduced to the speed Ne0, which does not cause an acceleration shock. The ignition-advancing time period Tg and the ignition-cut executing time period Tr" are uniquely determined in accordance with conditions on advancing the ignition timing. For example, when the ignition timing is advanced to a large extent, the ignition-advancing time period Tg becomes short. On the other hand, when the ignition timing is advanced to a little extent, the ignition-advancing time period Tg becomes long.

Accordingly, the ignition-advancing time period Tg and the ignition-cut executing time period Tr" can be obtained by means of, for example, an experiment or a simulation. In this embodiment, a map is stored beforehand in the storage device 90A so that the ignition-advancing time period Tg can be determined. In this map, the engine speed Ne and the ignition-advancing time period Tg are associated with each other. In addition, in this map, the ignition-advancing time period Tg is set to be different for each of the gear positions. This makes it possible to determine an appropriate ignition-advancing time period Tg in conjunction with the engine speed Ne, as well as with each of the gear positions so as to reduce the shock.

As described above, in this configuration, the play existing in the drive system of the vehicle can be promptly taken up by advancing the ignition timing of the engine 6 during the waiting time period (the ignition-advancing time period Tg) to the ignition cut. Accordingly, it is possible to reduce the acceleration shock while improving the acceleration response, in comparison with the first and second embodiments.

The present invention has been described so far with reference to the embodiments. However, it is to be clearly understood that the present invention is not limited to these embodiments. For example, in the above-described embodiments, descriptions have been given of the case where the ignition cut is executed over a predetermined time period (Tr, Tr', or Tr") after a predetermined waiting time period (Tw) elapses. However, the present invention is not limited to this case. The ignition cut may be executed over a predetermined number of ignition cycles after a predetermined waiting time period (Tw) elapses. In this case, the ignition cut may be executed over a predetermined number of ignition cycles. How many cycles over which the ignition cut is executed is preferably set to be different in conjunction with the engine speed Ne, and with the gear positions.

In addition, in the above-described embodiments, descriptions have been given of the case where the present invention is applied to a motorcycle on which a multi-cylinder engine is mounted. However, the present invention is not limited to this case, and may be applied also to a motorcycle on which a single-cylinder engine is mounted. Moreover, descriptions have been also given of the case where the present invention is applied to an acceleration shock reduction control system of a motorcycle. However, the present invention is not limited to this case, and may be applied also to an acceleration shock reduction control system of a three-wheeled vehicle or a four-wheeled vehicle, which is categorized as the ATV (all-terrain vehicle).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An acceleration shock reduction control system for a vehicle, comprising:

a control unit for determining a transition from a decelerating state to an accelerating state, and for controlling ignition of an internal combustion engine to adjust an output of the engine;

wherein upon detecting the transition from the decelerating state to the accelerating state, the control unit gives an instruction for an ignition cut which is executed, after a predetermined waiting time period (Tw), over a predetermined time period (Tr, Tr', Tr") or a predetermined number of ignition cycles, revolution sensors for detecting a number of rotations of a counter shaft and a number of rotations of a crankshaft, respectively, wherein when the difference in the number of rotations between the counter shaft and the crankshaft reaches a predetermined threshold, it is determined that the predetermined waiting time period elapses, wherein the ignition cut is executed at time (t2,t2',t2") when an engine speed has increased to a level that is less than an engine speed reached at time (tx') when acceleration shock occurs, wherein time (t2,t2',t2") is prior to time (tx'), wherein acceleration shock is shock due to backlash taken up after the transition from the decelerating state to the accelerating state and the engine speed at time (tx') is forced to decrease to a lower engine speed after time (tx').

2. The acceleration shock reduction control system for a vehicle according to claim 1, and further including a throttle opening degree sensor for detecting a throttle opening degree, wherein the transition from the decelerating state to the accelerating state is determined from an output of the throttle opening degree sensor.

3. The acceleration shock reduction control system for a vehicle according to claim 1, and further including a map of a throttle opening degree and an engine speed for determining a threshold for dividing a large throttle-opening region and a small throttle-opening region, wherein the transition from the decelerating state to the accelerating state is determined from a change in the throttle opening degree with respect to a predetermined threshold.

4. The acceleration shock reduction control system for a vehicle according to claim 2, and further including a map of the throttle opening degree and an engine speed for determining a threshold for dividing a large throttle-opening region and a small throttle-opening region, wherein the transition from the decelerating state to the accelerating state is determined from a change in the throttle opening degree with respect to a predetermined threshold.

5. The acceleration shock reduction control system for a vehicle according to claim 3, and further including a gear-position sensor which detects a current gear position, wherein a plurality of thresholds are used depending on a current gear position detected by the gear-position sensor.

6. The acceleration shock reduction control system for a vehicle according to claim 1, wherein different time periods for the ignition cut are set in conjunction with ranges of engine speed, and with gear positions.

7. The acceleration shock reduction control system for a vehicle according to claim 2, wherein different time periods for the ignition cut are set in conjunction with ranges of engine speed, and with gear positions.

8. The acceleration shock reduction control system for a vehicle according to claim 3, wherein different time periods for the ignition cut are set in conjunction with ranges of engine speed, and with gear positions.

9. The acceleration shock reduction control system for a vehicle according to claim 1, wherein an ignition timing is advanced during the predetermined waiting time period.

10. The acceleration shock reduction control system for a vehicle according to claim 2, wherein an ignition timing is advanced during the predetermined waiting time period.

11. The acceleration shock reduction control system for a vehicle according to claim 3, wherein an ignition timing is advanced during the predetermined waiting time period.

12. The acceleration shock reduction control system for a vehicle according to claim 6, wherein an ignition timing is advanced during the predetermined waiting time period.

* * * * *